US012682223B2

(12) United States Patent
Karakulak et al.

(10) Patent No.: US 12,682,223 B2
(45) Date of Patent: Jul. 14, 2026

(54) NON-UNIFORM QUANTIZATION FOR FLEXIBLE POWER-OF-TWO COMPUTATIONS IN NEURAL NETWORKS

(71) Applicant: SK hynix Inc., Icheon-si (KR)

(72) Inventors: Seyhan Karakulak, San Jose, CA (US); Fan Zhang, Fremont, CA (US)

(73) Assignee: SK HYNIX INC., Icheon-si (KR)

( * ) Notice: Subject to any disclaimer, the term of this patent is extended or adjusted under 35 U.S.C. 154(b) by 958 days.

(21) Appl. No.: 17/958,020

(22) Filed: Sep. 30, 2022

(65) Prior Publication Data

US 2024/0112020 A1    Apr. 4, 2024

(51) Int. Cl.
*G06N 3/0495* (2023.01)
*G06F 3/06* (2006.01)
*G06N 3/08* (2023.01)

(52) U.S. Cl.
CPC ......... *G06N 3/0495* (2023.01); *G06F 3/0616* (2013.01); *G06F 3/0634* (2013.01); *G06F 3/0679* (2013.01); *G06N 3/08* (2013.01)

(58) Field of Classification Search
CPC . G06F 12/0246; G06F 3/0679; G06N 3/0679; G06N 3/0495; G06N 3/04
See application file for complete search history.

(56) References Cited

U.S. PATENT DOCUMENTS 11,430,530 B2    8/2022  Zhang et al.
2020/0134461 A1*  4/2020  Chai ..................... G06N 3/0464

2020/0380357 A1*  12/2020  Yao ........................... G06N 3/08
2022/0011969 A1    1/2022  Zhang et al.
2022/0027721 A1    1/2022  Zhang et al.
2022/0336039 A1    10/2022  Zhang et al.

OTHER PUBLICATIONS

NPL Cardinaux Iteratively Training LUTs for N Quantization 2019.*
NPL Wang3 Learnable Lookup Table for NN Quantization Sep. 27, 2022.*
NPL Wang2 An in memory computing architecture 2021.*
NPL Li Additive Powers of Two Quantization 2020.*

(Continued)

*Primary Examiner* — Paul M Knight
(74) *Attorney, Agent, or Firm* — Perkins Coie LLP

(57) ABSTRACT

Devices, systems, and methods for improving operation of a memory device that uses a deep neural network (DNN), based on using non-uniform quantization for flexible power-of-two computations, are described. An example method includes receiving a plurality of initial weights of the DNN configured to determine a value of a read voltage associated with memory device, wherein the plurality of initial weights comprises at least one non-power-of-two quantized value or at least one floating point value. The method then aggregates the plurality of initial weights to generate a plurality of quantization functions, determines each of a plurality of quantized weights for a corresponding one of the plurality of quantization functions such that each of the plurality of quantized weights is a sum of powers-of-two, and configures the DNN to use the plurality of quantized weights to generate an updated value of the read voltage for retrieving information from the memory device.

20 Claims, 12 Drawing Sheets

(56)  References Cited

OTHER PUBLICATIONS

NPL Liu Modeling of Threshold Voltage Distribution in 3D NAND 2021.*

NPL Wang The Method of Predicting Retention Threshold Voltage 2019.*

NPL Park ML method to predict threshold voltage 2020.*

NPL Bailon Neural network aided reference voltage adaptation Sep. 6, 2022.*

NPL Wang DNN aided Read voltage Threshold Optimization 2020.*

NPL Choe Machine Learning Based Read Reference Voltage for NAND 2020.*

NPL Etmann A Closer Look at Double Backpropagation 2019.*

NPL Gundi Implementing a Timing Error Resilient Jun. 2022.*

NPL He ANN Assisted Error Correction for MLC NAND 2021.*

NPL Liu Using checksum to improve the reliability of embedded CNNs Aug. 2022.*

NPL Nagel A White Paper on Neural Network Quantization 2021.*

NPL Novac Quantization and Deployment of DNNs 2021.*

* cited by examiner

Memory System

110

| 102 | 104 | 106 | 108 |
|---|---|---|---|
| Memory Area | Memory Area | Memory Area | Memory Area |
| Memory Unit (e.g., block, page) | Memory Unit (e.g., block, page) | Memory Unit (e.g., block, page) | Memory Unit (e.g., block, page) |
| Memory Unit | Memory Unit | Memory Unit | Memory Unit |
| ⋮ | ⋮ | ⋮ | ⋮ |
| Memory Unit | Memory Unit | Memory Unit | Memory Unit |

. . .

120

121    Memory Interface (e.g., NAND memory interface)

| 122 | 123 | 124 | 125 |
|---|---|---|---|
| System Memory | Buffer/Cache | Processor | ECC Engine |

126    Host Interface (e.g., SATA, PATA, SD, USB, PCLe)

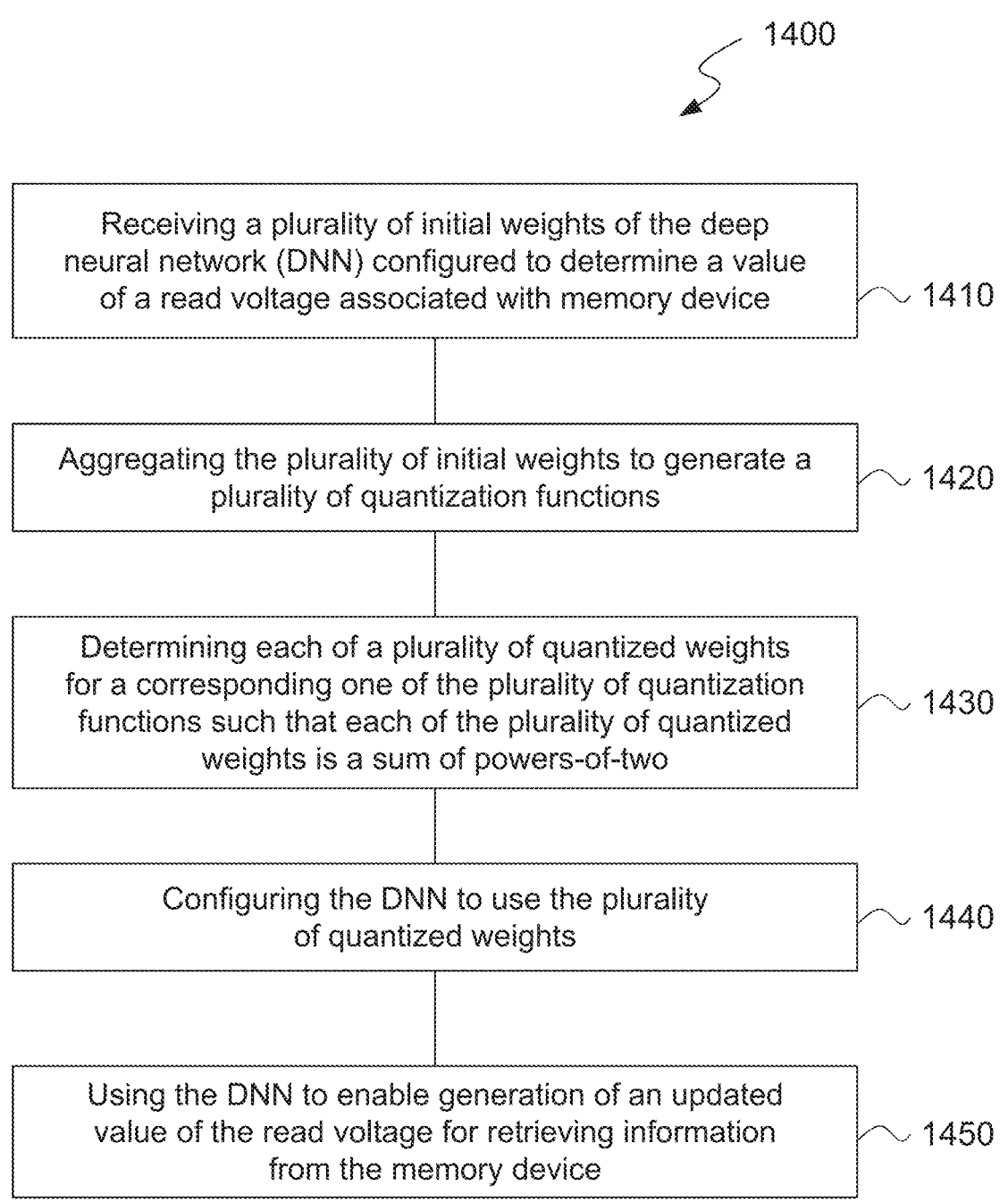

1400

Receiving a plurality of initial weights of the deep neural network (DNN) configured to determine a value of a read voltage associated with memory device — 1410

Aggregating the plurality of initial weights to generate a plurality of quantization functions — 1420

Determining each of a plurality of quantized weights for a corresponding one of the plurality of quantization functions such that each of the plurality of quantized weights is a sum of powers-of-two — 1430

Configuring the DNN to use the plurality of quantized weights — 1440

Using the DNN to enable generation of an updated value of the read voltage for retrieving information from the memory device — 1450

*FIG. 14*

NON-UNIFORM QUANTIZATION FOR FLEXIBLE POWER-OF-TWO COMPUTATIONS IN NEURAL NETWORKS

TECHNICAL FIELD

This patent document generally relates to non-volatile memory devices, and more specifically, to deep neural networks in non-volatile memory devices.

BACKGROUND

Data integrity is an important feature for any data storage device and data transmission. In solid state memory storage (e.g., NAND flash) devices, information is stored in a cell by different charge levels in a cell. During the write and read process, noise is introduced by program disturb and inter-cell interference charge leakage that causes the voltage level to drop over time, where the drop is proportional to the amount of charge stored as well as the number of program and erase (P/E) cycles a cell has experienced. Accounting for the voltage drop when determining the read voltage thresholds, e.g., using neural network-based algorithms, increases the longevity of memory devices.

SUMMARY

Embodiments of the disclosed technology relate to improving the operation of deep neural networks (DNNs) in non-volatile memory devices. In an example, the described embodiments enable the use of non-uniform quantization for power-of-two computations in the DNN, which advantageously reduces the latency and inference time of the DNN.

In one example, a method for improving the operation of a memory device that uses a deep neural network is described. The method includes receiving a plurality of initial weights of the deep neural network (DNN) configured to determine a value of a read voltage associated with memory device, wherein the plurality of initial weights comprises at least one non-power-of-two quantized value or at least one floating point value, aggregating the plurality of initial weights to generate a plurality of quantization functions, determining each of a plurality of quantized weights for a corresponding one of the plurality of quantization functions such that each of the plurality of quantized weights is a sum of powers-of-two, configuring the DNN to use the plurality of quantized weights, and using the DNN to enable generation of an updated value of the read voltage for retrieving information from the memory device.

In another example, a system for improving the operation of a memory device that uses a deep neural network is described. The system includes a processor and a memory including instructions stored thereupon, wherein the instructions, upon execution by the processor, cause the processor to receive a plurality of initial weights of the DNN configured to determine a value of a read voltage associated with memory device, wherein the plurality of initial weights comprises at least one non-power-of-two quantized value or at least one floating point value, aggregate the plurality of initial weights to generate a plurality of quantization functions, determine each of a plurality of quantized weights for a corresponding one of the plurality of quantization functions such that each of the plurality of quantized weights is a sum of powers-of-two, configure the DNN to use the plurality of quantized weights, and use the DNN to enable generation of an updated value of the read voltage for retrieving information from the memory device.

In yet another example, the methods may be embodied in the form of processor-executable instructions and stored on a computer-readable program medium.

The subject matter described in this patent document can be implemented in specific ways that provide one or more of the following features.

BRIEF DESCRIPTION OF THE DRAWINGS

FIG. 1 illustrates an example of a memory system.

FIG. 14 illustrates a flowchart of an example method for improving the operation of a non-volatile memory device that uses a deep neural network.

DETAILED DESCRIPTION

Figure 2:
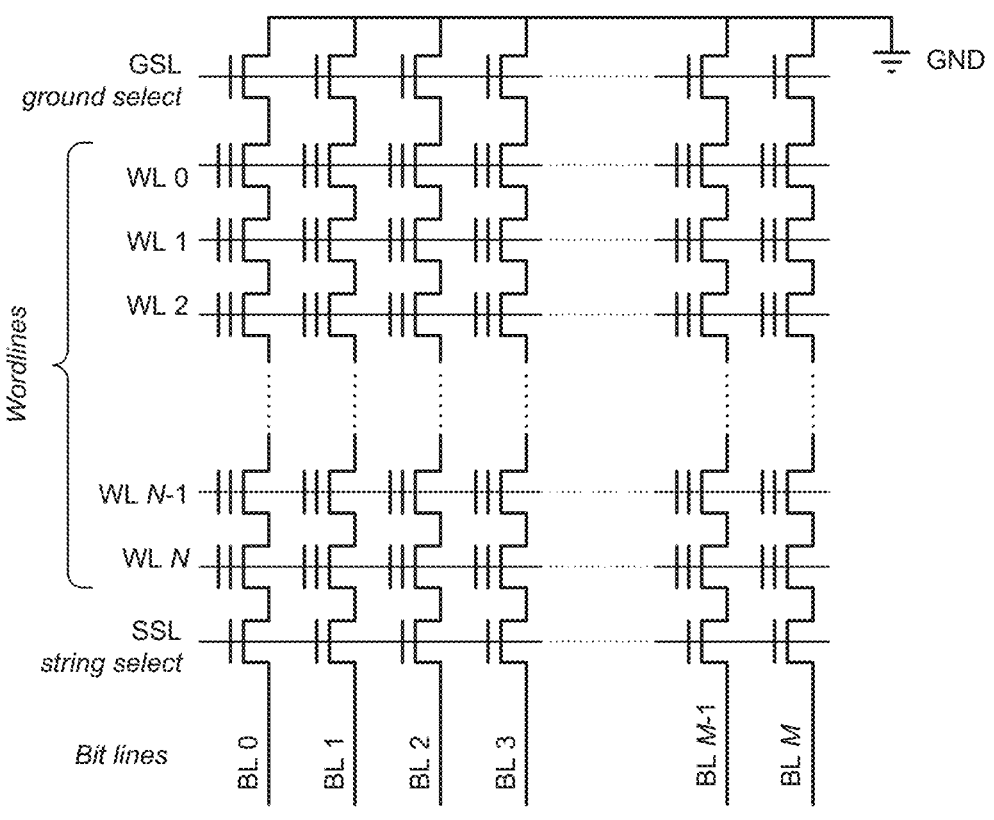
FIG. 2 is an illustration of an example non-volatile memory device.

Semiconductor memory devices may be volatile or non-volatile. The volatile semiconductor memory devices perform read and write operations at high speeds, while contents stored therein may be lost at power-off. The nonvolatile semiconductor memory devices may retain contents stored therein even at power-off. The nonvolatile semiconductor memory devices may be used to store contents, which must be retained regardless of whether they are powered.

With an increase in a need for a large-capacity memory device, a multi-level cell (MLC) or multi-bit memory device storing multi-bit data per cell is becoming more common. However, memory cells in an MLC non-volatile memory device must have threshold voltages corresponding to four or more discriminable data states in a limited voltage window. For improvement of data integrity in non-volatile memory devices, the levels and distributions of read voltages for discriminating the data states must be adjusted over the lifetime of the memory device to have optimal values during read operations and/or read attempts.

Several methods have been developed to generate optimal read voltages in a non-volatile memory device. Some methods employ a deep neural network (DNN), which is more traditionally used in areas such as computer vision (CV), natural language processing (NLP), robotics and speech. In an example, embodiments of the disclosed technology are directed to optimizing the operation of the DNN that is used by a non-volatile memory system (e.g., as described in FIGS. 1-6), which advantageously reduces the latency and inference time of the DNN. The optimizations include, for example, using non-uniform quantization for power-of-two computations in the DNN.

This patent document first overviews an example of a non-volatile memory system in which a DNN can be optimized to use non-uniform quantization for power-of-two computations, and then describes methods, systems, and devices to for improving the operation of a memory device that uses a deep neural network.

FIGS. 1-6 overview a non-volatile memory system (e.g., a flash-based memory, NAND flash) in which embodiments of the disclosed technology may be implemented.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively to temporarily, or persistently, store executable firmware/instructions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
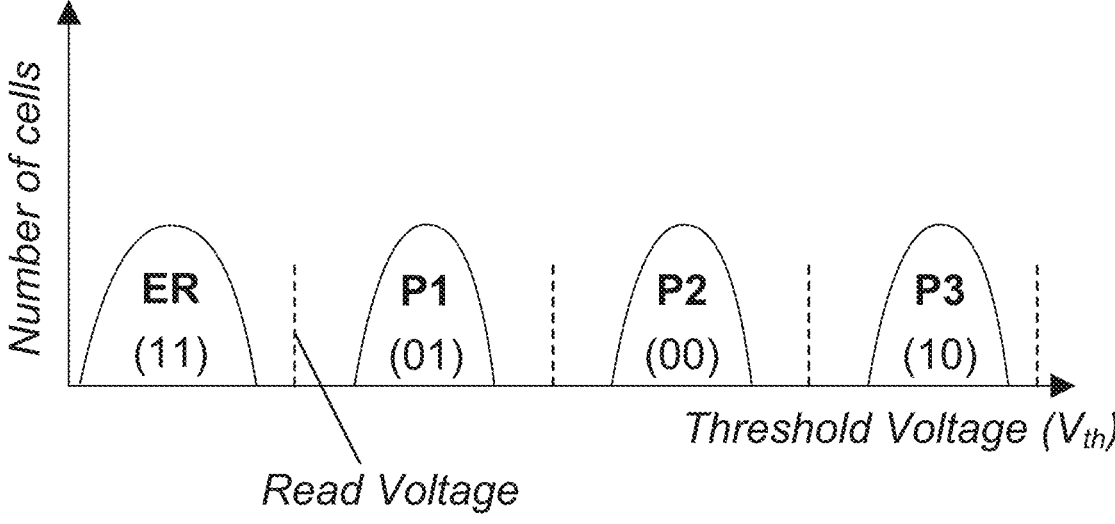
FIG. 3 is an example diagram illustrating the cell voltage level distribution (V t h) of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a staircase program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECCO).

Figure 4:
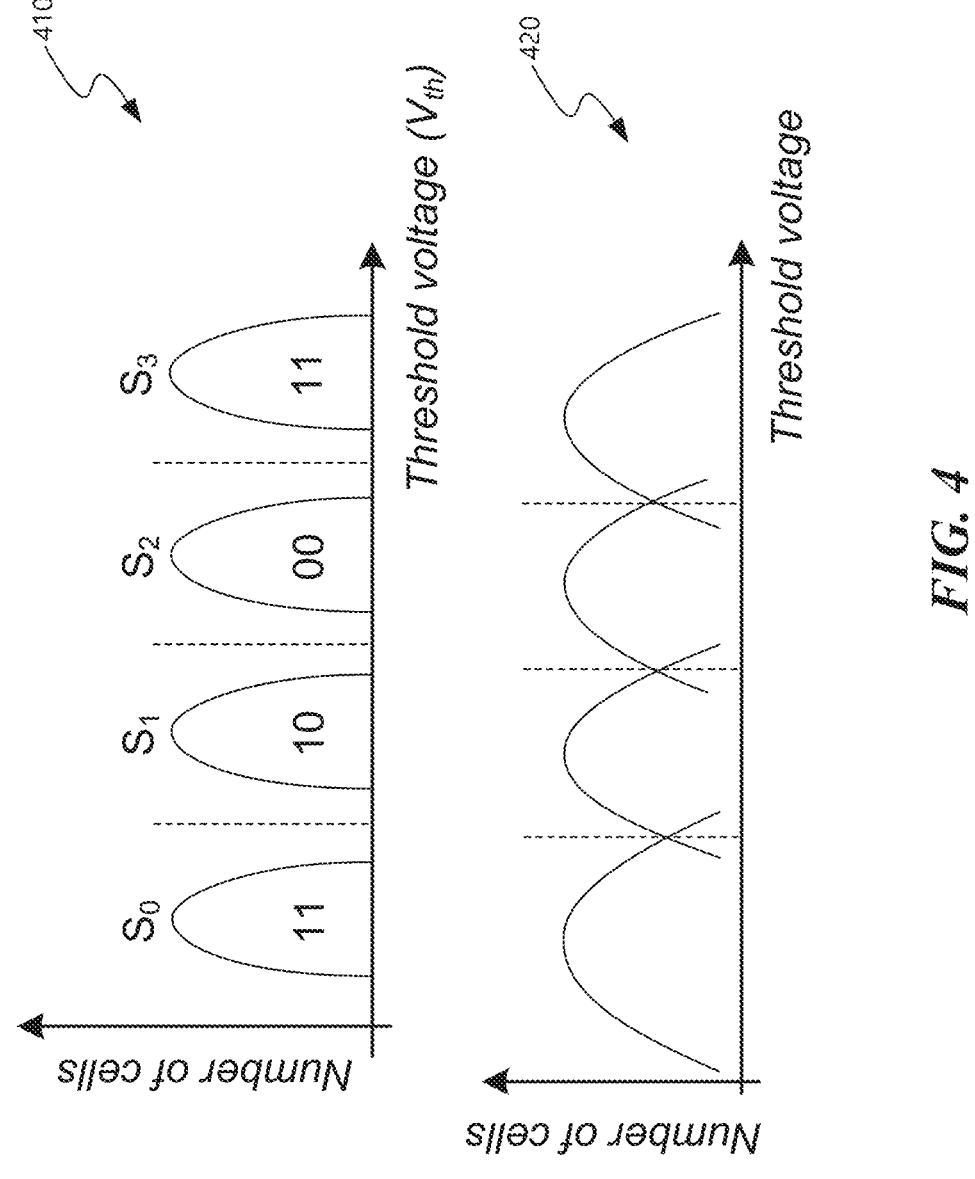
FIG. 4 is another example diagram illustrating the cell voltage level distribution (V t h) of a non-volatile memory device.

FIG. 4 illustrates an example of ideal threshold voltage distribution curves 410 and an example of distorted threshold voltage distribution curves 420. The vertical axis indicates the number of memory cells that has a particular threshold voltage represented on the horizontal axis.

For n-bit multi-level cell NAND flash memory, the threshold voltage of each cell can be programmed to $2n$ possible values. In an ideal multi-level cell NAND flash memory, each value corresponds to a non-overlapping threshold voltage window.

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping. The data bit stored in a memory cell with a threshold voltage programmed in the overlapping range of the neighboring distributions may be misjudged as a value other than the original targeted value.

Figure 5:
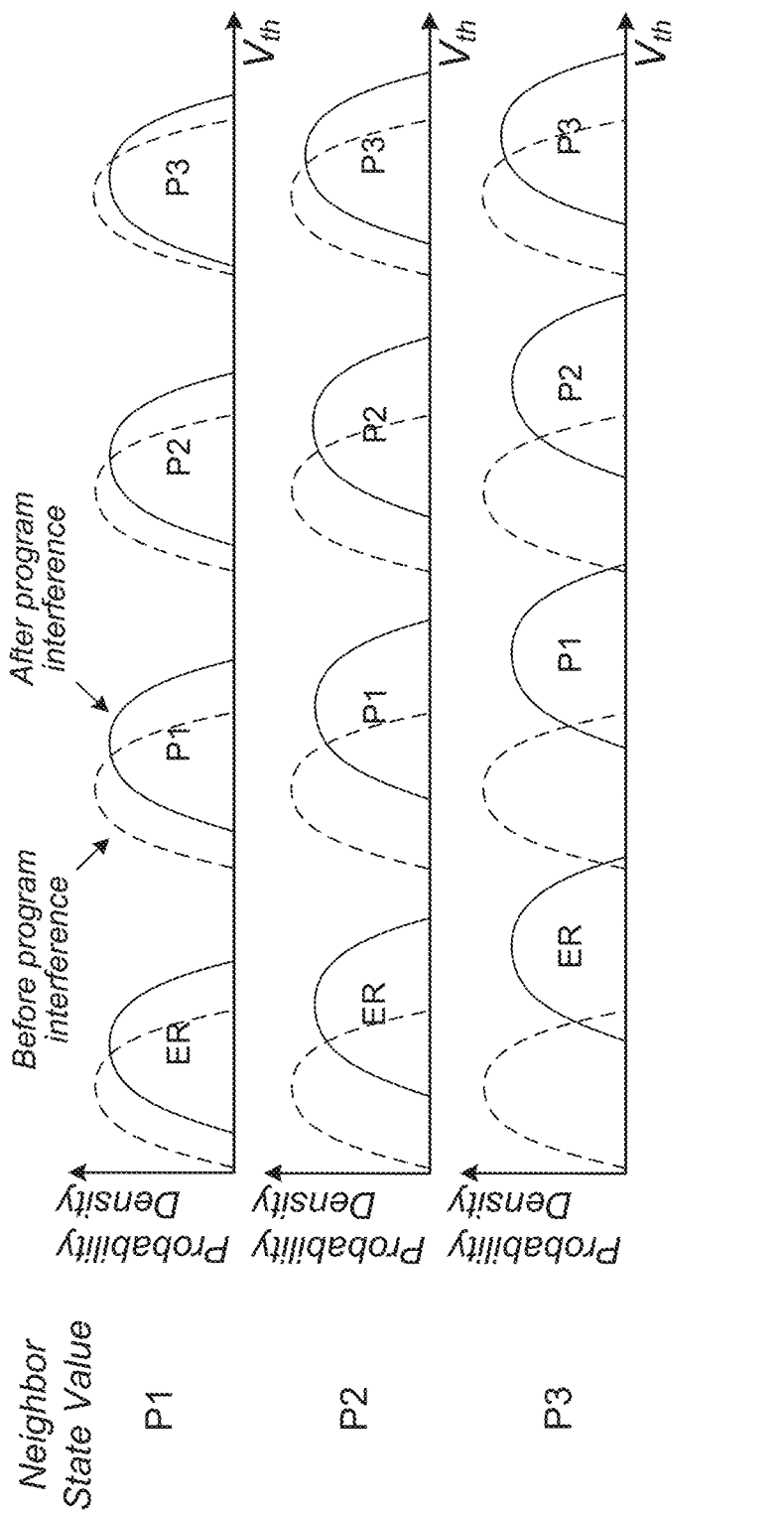
FIG. 5 is an example diagram illustrating the cell voltage level distribution (V t h) of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1. Similarly, the shift in the threshold voltage distributions is greatest when the neighboring state is programmed to P3.

Figure 6:
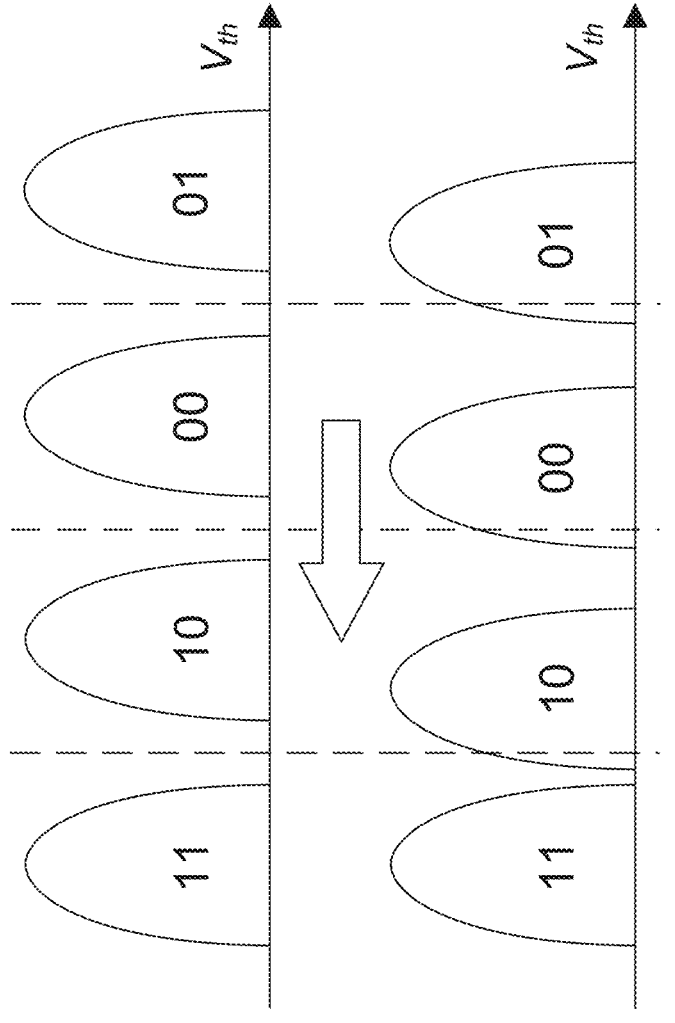
FIG. 6 is an example diagram illustrating the cell voltage level distribution (V t h) of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

In some embodiments, a non-volatile memory device (e.g., as described in FIGS. 1-6) may include a deep neural network (DNN), which is used to determine read thresholds (e.g., the read thresholds in FIG. 3).

A neural network refers to an algorithmic architecture that includes processing nodes arranged in layers. The first layer, also called the input layer, receives the input data to be processed, e.g., input data related to characteristics of a memory device. The last layer, also called the output layer, provides the processed output, e.g., read threshold voltages, calculated by the network for the input data. The layers in between the input and output layers are called the hidden layers. Example layers of a DNN include convolutional layers, activation layers, max-pooling or average-pooling layers, normalization layers, and fully-connected layers, among others. A network is referred to as a Deep Neural Network (DNN) when it has more than one, and often many, hidden layers.

Inference for a DNN, which may be implemented in a non-volatile memory device as described in FIGS. 1-6, is performed by a series of vector-matrix multiplications and simple non-linear operations that operate on the provided inputs, and weights and biases of the DNN. While each arithmetic operation may be simple, the number of these arithmetic operations required for every inference operation is massive. For example, the well-known AlexNet convolutional neural network (CNN), which can classify images to 1000 categories, has 230 million parameters and performs one and a half billion operations to classify one image of size 227×227×3. Thus, performing these operations on a processor without any hardware acceleration will results in a large latency for the inference, nullifying any improvement in the read quality of service (read-QoS) that may be achieved by using improved algorithms (e.g., the DNN) to generate the read thresholds for the non-volatile memory device. This issue becomes critical for devices with memory devices with DNNs are deployed as edge devices or Internet-of-Things (IoT) devices (e.g., a cellphone, camera, SSD), which have a limited memory footprint and power budget.

Embodiments of the disclosed technology provide, inter alia, the following benefits and advantages that mitigate the drawbacks of existing technology:

improving reliability and quality-of-service (QoS);
  reducing the memory footprint requirement of the DNN;
  reducing the computational power requirements of the DNN;
  working with both floating-point and fixed-point inputs;
  supporting arbitrary weight probability distributions; and
  reducing, more generally, the latency and inference time.

In some embodiments, the aforementioned benefits and advantages may be achieved by using a flexible power-of-two computation scheme that can be employed during the training phase or in a post-training phase. To avoid complex floating-point operations, all computations are performed in integer-only arithmetic with scaling operations to avoid underflow/overflow. Weights are stored in a compressed representation and are accessed using fixed-input fixed-output look-up tables. By using the described compression methods, which are applicable to any DNN implementation and not limited to the embodiments described herein, the weight-loading and inference time can be reduced.

Figure 7:
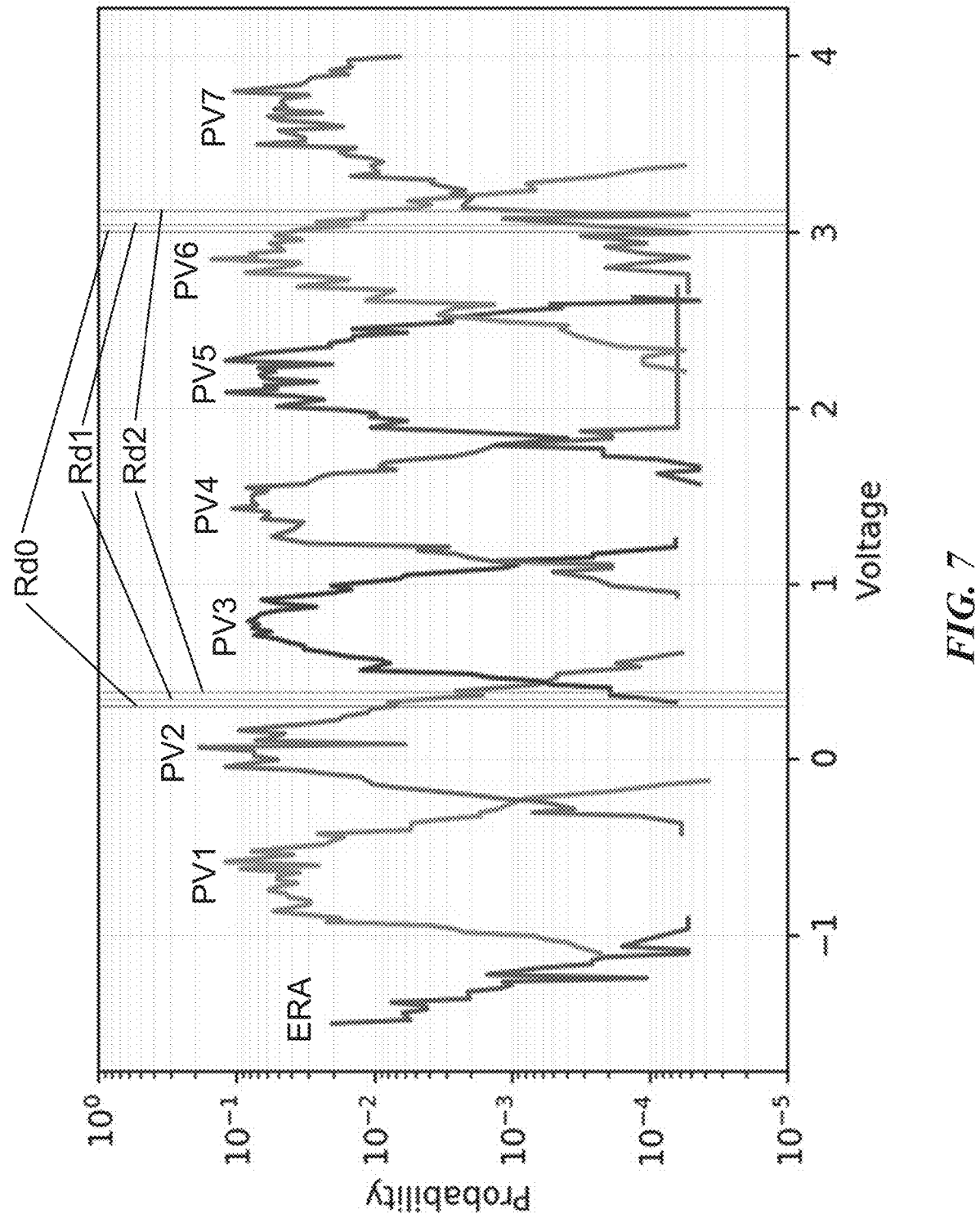
FIG. 7 is an example diagram illustrating voltage distributions and read levels.

FIG. 7 illustrates an example of empirical voltage probability distributions for a triple level cell (TLC) NAND flash block, wherein the read thresholds can be determined using a deep neural network with inputs that include read biases, checksums, and ones counts from a specified number of reads. The erase distribution (ERA) and program verify (PV) distributions (e.g., PV1-PV7) are shown in relation to the read thresholds (or read levels, e.g., Rd0, Rd1 and Rd2).

Figure 8:
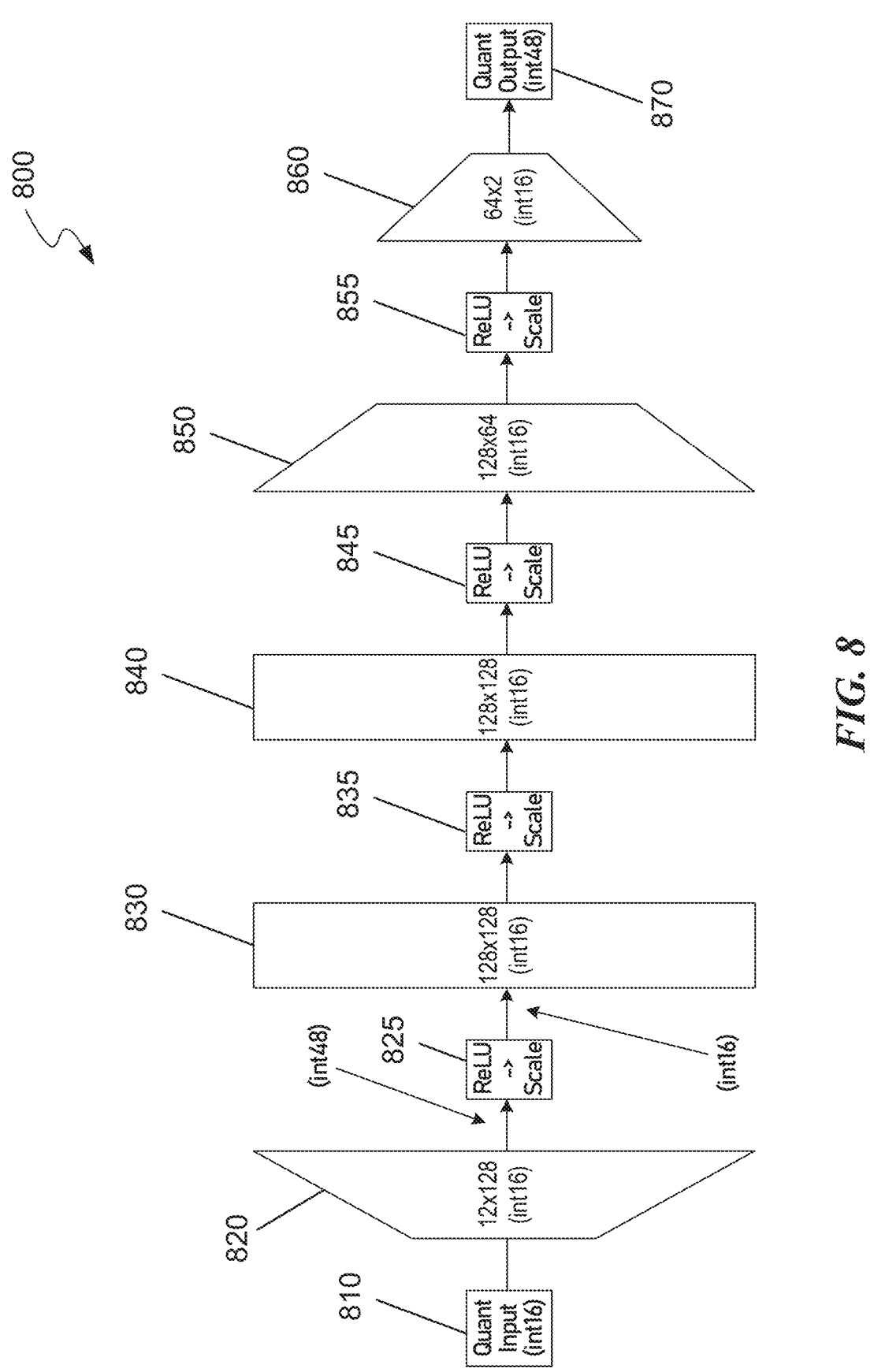
FIG. 8 illustrates an architecture of an example deep neural network (DNN) that can be configured to implement the described embodiments.

In some embodiments, the read thresholds in FIG. 7 can be estimated using the example DNN illustrated in FIG. 8. As shown therein, the DNN 800 includes multiple fully connected layers. In a fully connected layer, all the inputs from one layer are connected to every activation unit of the next layer. Different from a convolutional neural network (CNN) that is typically used to detect edges in image processing applications, the DNN illustrated in FIG. 8 is configured to use read biases, checksums, and ones counts from previous memory page reads and output an estimate of the optimal read voltages for that page. A CNN uses convolutional layers to detect edges and shapes by leveraging its translational equivariance properties, whereas the DNN discussed herein uses fully connected layers to determine optimal read thresholds.

In some embodiments, the input layer (820) and the hidden layers (830, 840 and 850) can have varying input and output dimensions. In the example illustrated in FIG. 8, the input layer 820 has dimensions 12×128, hidden layers 830 and 840 have dimensions 128×128, and hidden dimension 850 has dimensions 128×64. The input layer 820 and each of the hidden layers (830, 840, 850) are followed by a rectified linear unit (denoted ReLU) and a scaling function (denoted 825, 835, 845 and 855, respectively). The output layer 860 has an output dimension of two that provides estimates of the optimal read voltages for a page, which can be quantized to a higher precision using the output quantizer 870.

In some embodiments, the output dimension can be increased or decreased depending on the number of read voltages required for the logical page.

In some embodiments, the weights and biases are either quantized to a predetermined number of bits (e.g., 16-bit signed integers) or represented using floating point values. In the example illustrated in FIG. 8, the input layer 820, which receives 16-bit inputs from the input quantizer 810, operates using 16-bit integers (denoted int16) and generates a 48-bit output, which is subsequently scaled down to 16-bits through the ReLU and scaling operations.

Figure 9:
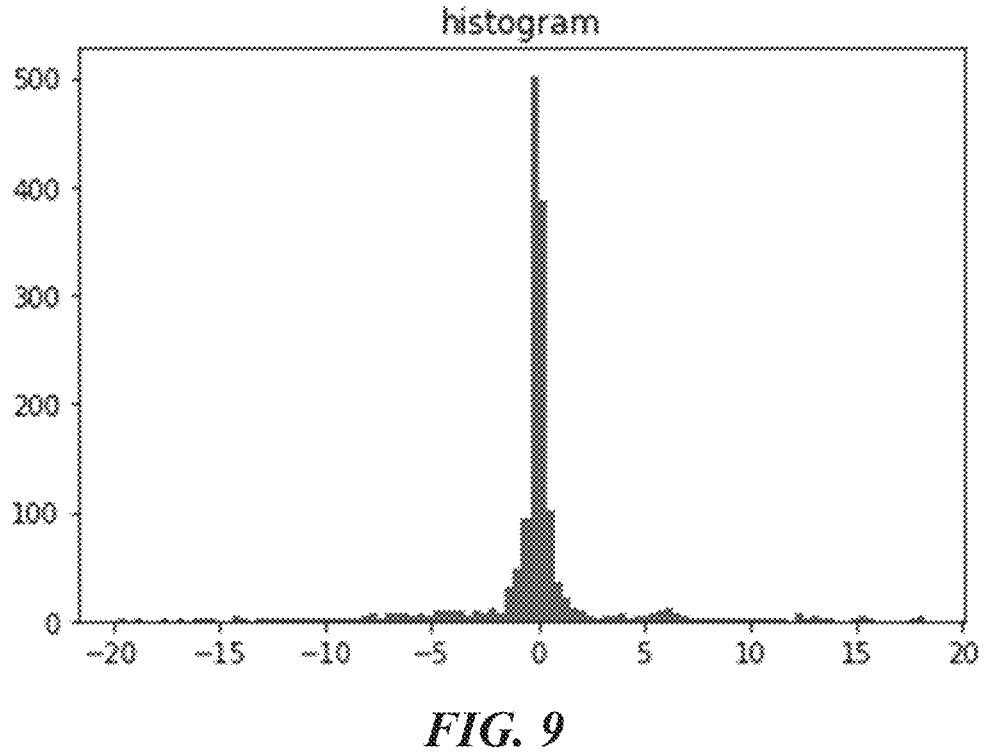
FIG. 9 illustrates an example weight distribution in a typical layer of the DNN.

Embodiments of the described technology include a flexible powers-of-two (FPoT) computation methodology that is well suited for weight distributions that concentrate around zero with long tails (e.g., a subtype of heavy-tailed distributions that are probability distributions whose tails are not exponentially bounded). In a uniform quantization scheme, the value intervals of weights are divided equally, regardless of the underlying weight distribution. Such a scheme would result in minimal quantization loss in the case of uniform weight distributions. However, the weight distributions in some algorithms (e.g., double backpropagation (DBP)) used by the DNN, e.g., the DNN illustrated in FIG. 8, have bell-shaped (or long-tailed) distributions, as shown in the example in FIG. 9. The described embodiments use a non-uniform quantization methodology that takes the underlying weight distribution into account when deploying the FPoT computations.

In some embodiments, each weight in the FPoT computation scheme is the sum of powers of two, and can be implemented in hardware by bit shifts and accumulators. This implementation enables the matrix and vector-matrix multiplications to be performed using powers-of-two computations. The FPoT computations can be configured to target a specified quantization level, which results in latency improvements and can be used in various deployments, e.g., mobile applications.

In some embodiments, the weights of the FPOT computation methodology in the DNN are quantized to certain quantization levels Q(r,k,l) to support any arbitrary distribution (e.g., a long-tailed distribution). The quantization level is determined as:

$$Q(r, k, l) = \left\{ s : s \in \sum_{i=0}^{r-1} p_i \text{ where } p_i \in \left\{ 0, 2^{-1}, 2^{-2}, \ldots, 2^{-2^k+2} \right\}, |S| = l \right\}.$$

Herein, the value of every quantized weight s is a sum of r powers-of-two, and k is a parameter indicative of a precision of the quantized weight. The weights s are elements of the set S and can be determined using a clustering algorithm for a particular quantization level l. In an example, the clustering algorithm is based on Llyod-Max clustering. In another example, the clustering algorithms is based on k-means clustering.

In some embodiments, the parameters of FPoT computation methodology can be adjusted if the performance is not acceptable. For example, to improve performance, k or r may be increased. Alternatively, both k and r may be increased. Alternatively, the quantization level I may be increased to improve performance.

In some embodiments, and as discussed above, the FPoT computations can be implemented using shift operations.

Figure 10:
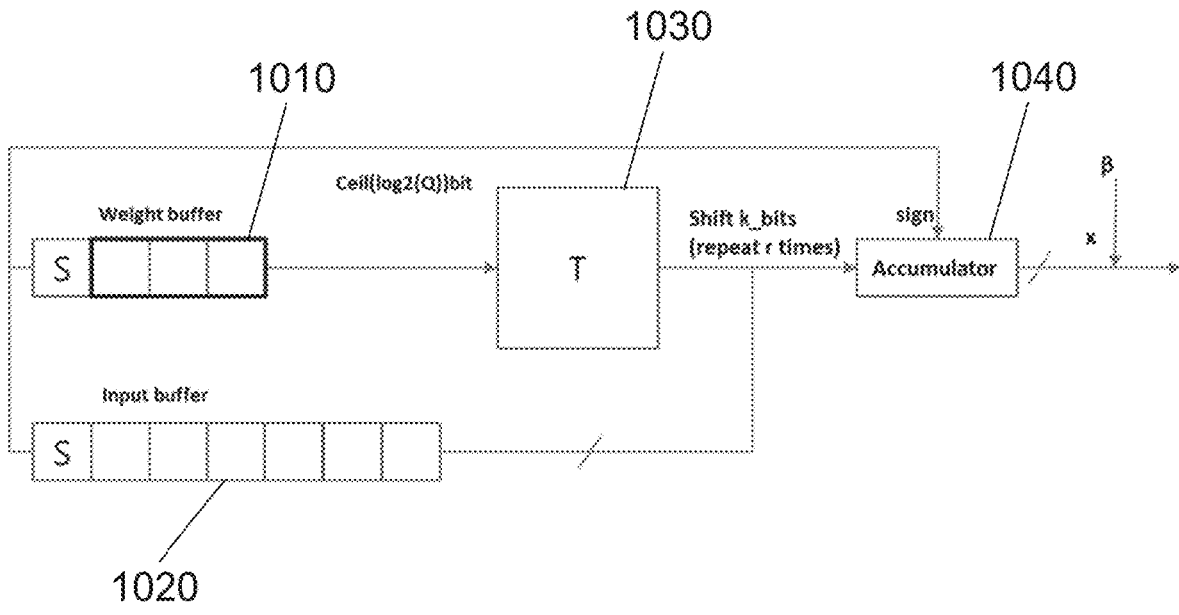
FIG. 10 is a block diagram illustrating an example implementation of the flexible power-of-two computations using shift operations.

For example, the multiply-and-accumulate (MAC) operation can be implemented using shift operations, as shown in FIG. 10. In this example, it is assumed that r=4, k=4, and l=8 quantization levels are used, and the weights are scaled by 1/β such that the absolute value of the weights is less than or equal to 1. Based on these parameters, only 3 bits are used to represent each weight, and each of these 8 weights can be represented as a sum of four values from the set $\{0, 2^{-1}, 2^{-2}, 2^{-2^{k}+2}\}$. The MAC operation may be implemented using the following steps:

Step 1: Load weights w into the weight buffer 1010 and the input value into the input buffer 1020. In an example, a high-precision fixed-point format is used for the input value;

Step 2: Use the 3-bit weight value to look up the r×k bits;

Step 3: For each shift value, shift the input buffer 1020 to the right and accumulate the output into the accumulator buffer;

Step 4: Use the XOR (exclusive OR operation) of the sign bits from the weight buffer and input buffer (denoted "S" in FIG. 10) as the sign bit of the accumulator 1040; and Step 5: multiply the output of the accumulator by P.

The values of r, k, and l used in the description of FIG. 10 are only examples, and as discussed earlier, these parameters may be adjusted to meet a desired performance. Adjusting these parameters would consequently result in the bit widths of the weight and input buffers being different from those described in the context of FIG. 10.

In some embodiments, the powers-of-two for the FPoT computation scheme are stored in a compressed format along with a look-up table stored in a decompression table. In an example, the compressed weight is an n-bit index that is used as the address in the look-up table to determine the powers-of-two for the decompressed weight. The decompression block may be configured to receive a fixed-length segment from the compressed-weights bitstream and then determine the decompressed weights by reading the (r×k)-bit element at the corresponding address in the look-up table.

In some embodiments, the decompression block may be implemented with any degree of parallelization, which enables it to receive multiple segments from the bitstream due to the fixed-length characteristic of the input segment.

In an example of the look-up table approach, Table 1 (shown below) stores the 16-bit decompressed powers-of-two at their corresponding indices. The 16-bit decompressed weights are used in the MAC operation (as discussed in the context of FIG. 10), and the weight-loading latency is reduced by 50% when the compressed form is used for the weights.

TABLE 1

| Look-up table for FPoT computation scheme | |
|---|---|
| Weight index | Powers-of-two |
| 00000000 | 0001010000100001 |
| 00000001 | 0101000000100001 |
| 00000010 | 1001010000101001 |
| . . . | . . . |
| 11111111 | 1101010000101101 |

Although the non-uniform quantization has been described in the context of the FPoT computation methodology, the embodiments describing non-uniform quantization can be applied to any deployment of deep neural networks with large memory requirements for storing model parameters, e.g., image processing and classification on edge devices. Furthermore, the examples presented herein are not meant to limit different levels of quantization and clustering algorithms that can be used in the described embodiments. As discussed earlier, the non-uniform quantization scheme may be applied during the training phase or in a post-training phase.

Figure 11:
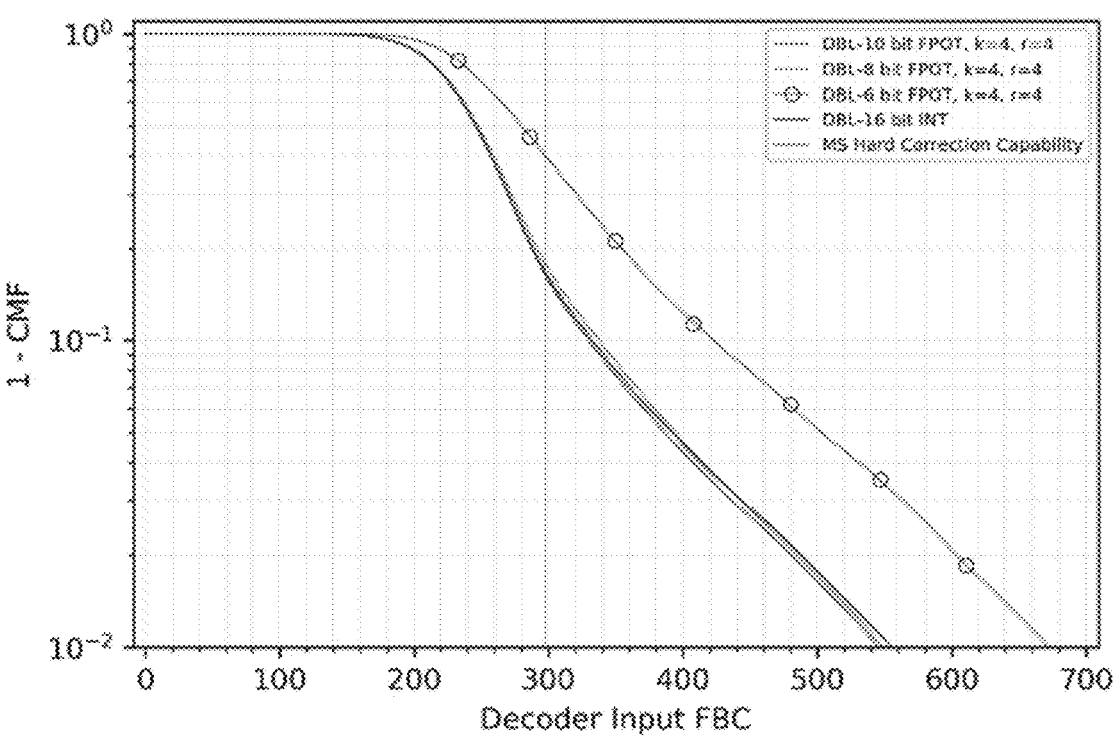
FIGS. 11-13 illustrate the performance of an example embodiment in terms of the cumulative mass function (CMF), the probability mass function (PMF), and the failed bit count (FBC), respectively.
Figure 12:
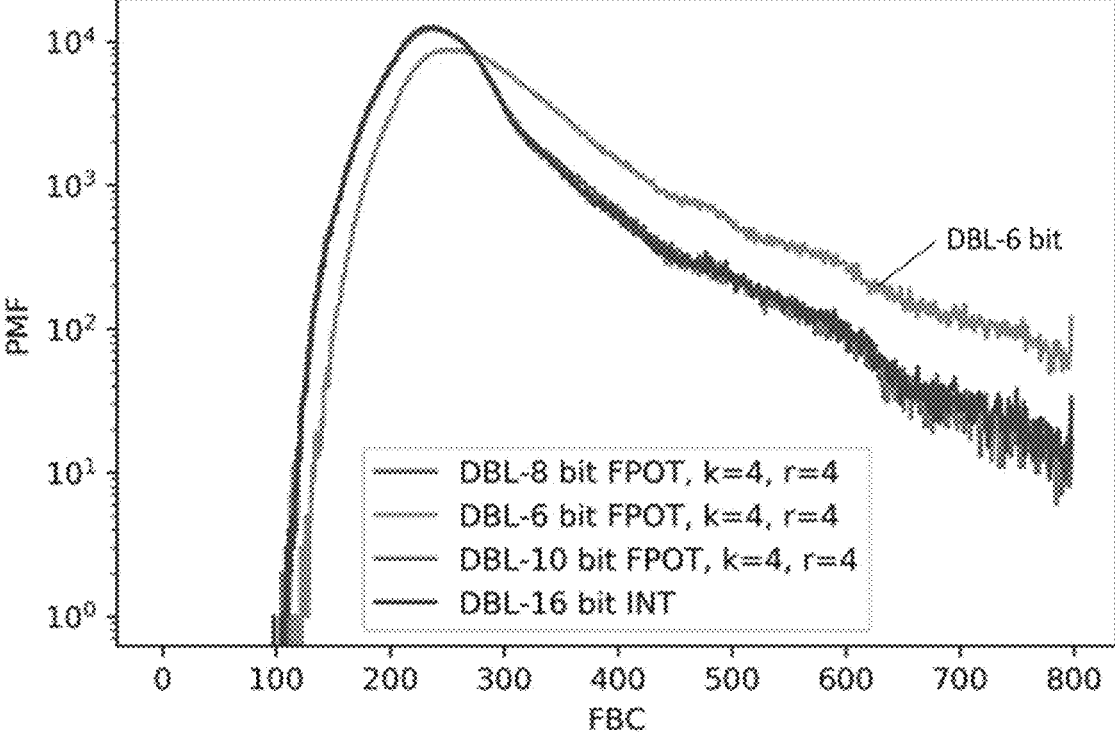
Figure 13:
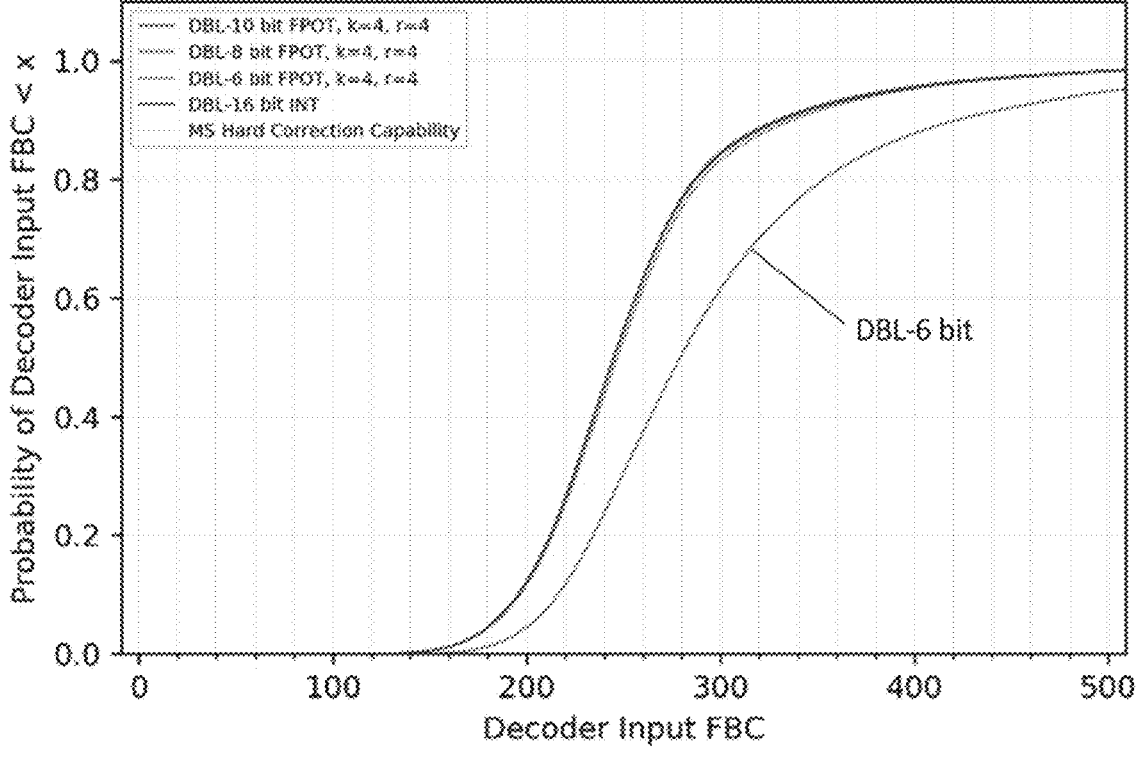

FIGS. 11-13 are numerical plots that illustrate the efficacy of the FPoT computations with 6-bit, 8-bit, and 10-bit quantization levels. FIG. 11 shows the performance in terms of the cumulative mass function (CMF), FIG. 12 shows the performance in terms of the probability mass function (PMF), and FIG. 13 shows the performance in terms of the probability of the decoder input having a failed bit count (FBC) less than a threshold. As seen in these performance plots, there is negligible degradation in performance (or none at all) when 8-bit and above quantization levels are implemented compared to 16-bit double (DBL) precision.

FIG. 14 illustrates a flowchart of an example method 1400 for improving the operation of a non-volatile memory device that uses a deep neural network. The method 1400 includes, at operation 1410, receiving a plurality of initial weights of the deep neural network (DNN) configured to determine a value of a read voltage associated with memory device, the plurality of initial weights comprising at least one non-power-of-two quantized value or at least one floating point value.

The method 1400 includes, at operation 1420, aggregating the plurality of initial weights to generate a plurality of quantization functions.

The method 1400 includes, at operation 1430, determining each of a plurality of quantized weights for a corresponding one of the plurality of quantization functions such that each of the plurality of quantized weights is a sum of powers-of-two.

The method 1400 includes, at operation 1440, configuring the DNN to use the plurality of quantized weights.

The method 1400 includes, at operation 1450, using the DNN to enable generation of an updated value of the read voltage for retrieving information from the memory device.

In some embodiments, inputs to the DNN comprise at least one of a read bias, a checksum, or a ones count associated with a previous value of the read voltage.

In some embodiments, each of the plurality of quantization functions is based on (1) the quantized weight associated with a corresponding quantization function, (2) a number of power-of-two terms in the quantized weight, (3) a parameter indicative of a precision of the quantized weight, and (4) a quantization level for the quantized weight. In an example, and as described above, the quantization level is determined as:

$$Q(r, k, l) = \left\{ s : s \in \sum_{i=0}^{r-1} p_i \text{ where } p_i \in \left\{ 0, 2^{-1}, 2^{-2}, \ldots, 2^{-2^{k}+2} \right\}, |s| = l \right\}.$$

In some embodiments, aggregating the plurality of initial weights is performed using a clustering algorithm that comprises a Llyod-Max or a k-means clustering algorithm.

In some embodiments, the quantization level for the quantized weight is greater than or equal to 8. In an example, the number of power-of-two terms in the quantized weight is equal to 4, the parameter indicative of the precision of the quantized weight is equal to 4, and the quantization level for the quantized weight is equal to 8.

In some embodiments, the method 1400 further includes the operation of scaling, prior to configuring the DNN (e.g., scaling by as illustrated in FIG. 10), each of the plurality of quantized weights by a scaling factor such that a maximum absolute value of each of the plurality of quantized weights is less than or equal to 1.

In some embodiments, the plurality of quantized weights are stored in a compressed format that is associated with a look-up table, and the compressed format comprises an n-bit index that is an address for a row in the LUT that stores the corresponding quantized weight.

In some embodiments, the determining the each of a plurality of quantized weights comprises a multiply-accumulate (MAC) operation (e.g., as illustrated in FIG. 10).

In some embodiments, the memory device is a triple level cell (TLC) NAND flash memory device.

Embodiments of the disclosed include an apparatus for improving the operation of a non-volatile memory device that uses a deep neural network. The apparatus includes a processor and a memory including instructions stored thereupon, wherein the instructions, upon execution by the processor, cause the processor to receive a plurality of initial weights of the DNN configured to determine a value of a read voltage associated with memory device, wherein the plurality of initial weights comprises at least one non-power-of-two quantized value or at least one floating point value, aggregate the plurality of initial weights to generate a plurality of quantization functions, determine each of a plurality of quantized weights for a corresponding one of the plurality of quantization functions such that each of the plurality of quantized weights is a sum of powers-of-two, configure the DNN to use the plurality of quantized weights, and use the DNN to enable generation of an updated value of the read voltage for retrieving information from the memory device.

Figure 15:
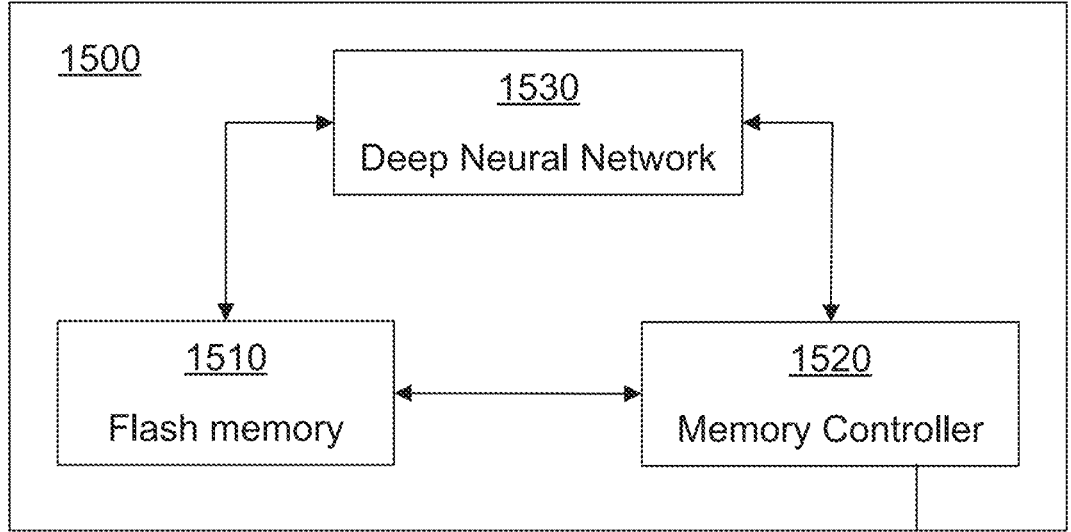
FIG. 15 is an example diagram illustrating a storage device that can be configured to implement the described embodiments.

FIG. 15 is an example diagram illustrating a storage device that can be configured to implement the described embodiments. Referring to FIG. 15, a data storage device 1500 may include a flash memory 1510, a memory controller 1520, and a deep neural network (DNN) 1530. The memory controller 1520 may control the flash memory 1510 and the DNN 1530 in response to control signals input from the outside of the data storage device 1500. In the data storage device 1500, the flash memory 1510 may be configured the same or substantially the same as a nonvolatile memory device. That is, the flash memory 1510 may read data from selected memory cells using, for example, the described embodiments implemented by the DNN 1530. The read data is then output to the memory controller 1520.

In some embodiments, the data storage device 1500 may be a memory card device, an SSD device, a multimedia card device, an SD card, a memory stick device, an HDD device, a hybrid drive device, or an USB flash device. For example, the data storage device 1500 may be a card which satisfies the standard for user devices such as a digital camera, a personal computer, and so on.

In some embodiments, the DNN 1530 may be configured to implement the methods described in FIG. 14, and the embodiments described in this patent document.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for operating a memory device that uses a deep neural network, comprising:
   receiving a plurality of initial weights of the deep neural network (DNN) trained to determine a value of a read voltage associated with the memory device, wherein the plurality of initial weights comprises at least one non-power-of-two quantized value or at least one floating point value;
   determining, based on aggregating the plurality of initial weights, each of a plurality of quantized weights as a sum of powers-of-two;
   configuring the DNN to use the plurality of quantized weights; and
   using the DNN to enable generation of an updated value of the read voltage for retrieving information from the memory device, wherein inputs to the DNN comprise a checksum or a ones count associated with a previous value of the read voltage.

2. The method of claim 1, wherein a quantized weight of the plurality of quantized weights is determined based on (1) a number of power-of-two terms in the quantized weight (r), (2) a parameter indicative of a precision of the quantized weight (k), and (3) a quantization level for the quantized weight (l), and wherein each of r, k, and l is a positive integer.

3. The method of claim 2, wherein the quantized weight(s) is an element of a set of quantized weights(S), wherein the quantized weight is determined as:

$$s \in \sum_{i=0}^{r-1} p_i \text{ where } p_i \in \left\{0, 2^{-1}, 2^{-2}, \dots, 2^{-2^k+2}\right\},$$

and wherein a cardinality of the set of quantized weights (|S|) is equal to the quantization level (l) for the quantized weight.

4. The method of claim 2, wherein the quantization level for the quantized weight is greater than or equal to 8.

5. The method of claim 4, wherein the number of power-of-two terms in the quantized weight is equal to 4, the parameter indicative of the precision of the quantized weight is equal to 4, and the quantization level for the quantized weight is equal to 8.

6. The method of claim 1, wherein aggregating the plurality of initial weights is performed using a clustering algorithm that comprises a Llyod-Max clustering algorithm or a k-means clustering algorithm.

7. The method of claim 1, further comprising:
   scaling, prior to configuring the DNN, each of the plurality of initial weights by a first scaling factor such that a maximum absolute value of each of the plurality of initial weights is less than or equal to 1.

8. The method of claim 7, wherein using the DNN comprises performing a multiply-accumulate operation based on at least one of the plurality of quantized weights, and wherein the method further comprises:
   scaling an output of the multiply-accumulate operation by a second scaling factor,
   wherein the first scaling factor is 1/β and the second scaling factor is β.

9. The method of claim 1, wherein the plurality of quantized weights are stored in a compressed format that is associated with a look-up table.

10. The method of claim 9, wherein the compressed format comprises an n-bit index that is an address for a row in the look-up table that stores a corresponding quantized weight.

11. The method of claim 1, wherein the memory device is a triple level cell (TLC) NAND flash memory device.

12. The method of claim 1, wherein the plurality of quantized weights are determined based on a weight distribution in at least one algorithm implemented by the deep neural network.

13. The method of claim 12, wherein the at least one algorithm is a double backpropagation (DBP) algorithm.

14. A system for operating a memory device that uses a deep neural network (DNN), comprising:
   a processor and a memory including instructions stored thereupon, wherein the instructions upon execution by the processor cause the processor to:
   receive a plurality of initial weights of the DNN trained to determine a value of a read voltage associated with the memory device, wherein the plurality of initial weights comprises at least one non-power-of-two quantized value or at least one floating point value;
   determine, based on aggregating the plurality of initial weights, each of a plurality of quantized weights as a sum of powers-of-two;
   configure the DNN to use the plurality of quantized weights; and
   use the DNN to enable generation of an updated value of the read voltage for retrieving information from the memory device, wherein inputs to the DNN comprise a checksum or a ones count associated with a previous value of the read voltage.

15. The system of claim 14, wherein a quantized weight of the plurality of quantized weights is determined based on (1) a number of power-of-two terms in the quantized weight (r), (2) a parameter indicative of a precision of the quantized weight (k), and (3) a quantization level for the quantized weight (l), and wherein each of r, k, and l is a positive integer.

16. The system of claim 14, further comprising:
   scaling, prior to configuring the DNN, each of the plurality of quantized weights by a scaling factor such that a maximum absolute value of each of the plurality of quantized weights is less than or equal to 1.

17. The system of claim 14, wherein the plurality of quantized weights are stored in a compressed format that is associated with a look-up table, and wherein the compressed format comprises an n-bit index that is an address for a row in the look-up table that stores a corresponding quantized weight.

18. A non-transitory computer-readable storage medium having instructions stored thereupon for operating a memory device that uses a deep neural network, comprising:

instructions for receiving a plurality of initial weights of the deep neural network (DNN) trained to determine a value of a read voltage associated with the memory device, wherein the plurality of initial weights comprises at least one non-power-of-two quantized value or at least one floating point value;

instructions for determining, based on aggregating the plurality of initial weights, each of a plurality of quantized weights as a sum of powers-of-two;

instructions for configuring the DNN to use the plurality of quantized weights; and instructions for using the DNN to enable generation of an updated value of the read voltage for retrieving information from the memory device, wherein inputs to the DNN comprise a checksum or a ones count associated with a previous value of the read voltage.

19. The non-transitory computer-readable storage medium of claim 18, wherein a quantized weight of the plurality of quantized weights is determined based on (1) a number of power-of-two terms in the quantized weight (r), (2) a parameter indicative of a precision of the quantized weight (k), and (3) a quantization level for the quantized weight (l), and wherein each of r, k, and l is a positive integer.

20. The non-transitory computer-readable storage medium of claim 18, wherein the plurality of quantized weights are stored in a compressed format that is associated with a look-up table, and wherein the compressed format comprises an n-bit index that is an address for a row in the look-up table that stores a corresponding quantized weight.

\* \* \* \* \*